(12) United States Patent
Narayan-Sarathy et al.

(10) Patent No.: US 7,214,725 B2
(45) Date of Patent: May 8, 2007

(54) RADIATION-CURABLE LITHOGRAPHIC INKS FROM MULTIFUNCTIONAL ACRYLATE OLIGOMERS

(75) Inventors: Sridevi Narayan-Sarathy, Dublin, OH (US); Lisa M. Hahn, Delaware, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 10/835,058

(22) Filed: Apr. 30, 2004

(65) Prior Publication Data

US 2005/0245630 A1    Nov. 3, 2005

(51) Int. Cl.
*C08F 2/46* (2006.01)

(52) U.S. Cl. .............. 522/81; 522/71; 522/84; 522/173; 522/178; 522/182; 522/183; 522/181; 522/904; 106/31.13; 106/31.6; 428/411.1; 101/450.1; 101/451

(58) Field of Classification Search ............. 522/71, 522/81, 84, 173, 178, 182, 183, 181, 904; 523/160; 428/411.1; 101/450.1, 451; 106/31.13, 106/31.6

See application file for complete search history.

(56) References Cited

U.S. PATENT DOCUMENTS

| 5,945,489 | A | | 8/1999 | Moy et al. |
| 5,969,046 | A | * | 10/1999 | Schindler et al. ........... 525/108 |
| 6,025,410 | A | | 2/2000 | Moy et al. |
| 6,284,816 | B1 | * | 9/2001 | Laksin et al. ............... 523/160 |
| 6,489,375 | B2 | | 12/2002 | Stone et al. |
| 6,673,851 | B2 | * | 1/2004 | Moy et al. ................. 522/173 |
| 6,706,414 | B1 | * | 3/2004 | Dammann et al. .......... 428/524 |
| 2003/0073757 | A1 | * | 4/2003 | Moy et al. ................. 522/176 |

OTHER PUBLICATIONS

Bassemir et al, Inks, Kirk-Othmer Encyclopedia of Chemical Technology. [online], Aug. 13, 2004 [retrieve Jan. 23, 2006]. retrieved from Internet: <URL:http://www.mrvinterscience.wiley.com/kirk/articles/inksbass.aol/sect2.html>.*

* cited by examiner

*Primary Examiner*—Sanza L. McClendon

(57) ABSTRACT

The present invention relates generally to radiation-curable ink formulations, and particularly, but not by way of limitation, to a family of radiation-curable ink formulations specifically for lithographic printing applications. The inventive ink formulations are based on multifunctional acrylate resins formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions.

11 Claims, 1 Drawing Sheet

US 7,214,725 B2

RADIATION-CURABLE LITHOGRAPHIC INKS FROM MULTIFUNCTIONAL ACRYLATE OLIGOMERS

FIELD OF THE INVENTION

The present invention relates generally to radiation-curable ink formulations, and particularly, but not by way of limitation, to a family of radiation-curable ink formulations specifically for lithographic applications. The inventive ink formulations are based on multifunctional acrylate resins formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions.

BACKGROUND

The information provided below is not admitted to be prior art to the present invention, but is provided solely to assist the understanding of the reader.

Lithography is the most widely used printing process in which UV and EB inks are employed. Various substrates including paper, carton board, metal, plastic and laminates can be printed by this method. The pros of using UV inks in this process are that they are cleaner and easier to handle. This offsets the fact that they are less versatile in terms of their ink/water balance when running on a press. Printing requirements for offset lithographic inks include high viscosity, good flow and transfer properties, good tack values for sharp imaging, low misting values, insolubility in water but stable emulsion formation with water and sufficient color strength to reproduce the image at a 1–2 micron film thickness. It is desired in the printing industry to produce inks and coatings with high gloss and opacity. In order to convey these desired properties, the base oligomer in a UV/EB curable formulation must provide excellent pigment wetting characteristics to produce an ink of high gloss and opacity or hiding power. Moreover, the base oligomer controls adhesion to the printed substrate. The surface tension, polarity of the ink vehicle, and chemical nature of materials used influence pigment wetting and substrate adhesion characteristics.

Conventional UV lithographic printing requires the use of substantial quantities of a mix of different photoinitiators to ensure optimum cure under all conditions. Moreover, assurance of proper adhesion to low energy substrates, typically used in lithographic printing, also requires the use of a mix of significant quantities of photoinitiator. Traditional photoinitiators (e.g., benzophenone) can be toxic, expensive, and malodorous and contribute to film color, which can limit applicability in white and light-colored inks.

The amount of external photoinitiator in lithographic ink formulations can be significantly reduced by using the acrylate oligomer technology described in patents U.S. Pat. No. 5,945,489 and 6,025,410 (both Ashland, Inc.). These patents disclose uncrosslinked resins prepared via the Michael addition reaction of β-dicarbonyl compounds with multifunctional acrylates. The invention disclosed here demonstrates the advantageous use of these uncrosslinked resins alone or modified by reaction/blending with additional materials in ink formulations for lithographic printing applications. These additional materials include a variety of acrylic monomers and oligomers, free-radically reactive vinyl monomers, primary and secondary and tertiary amines, acid-functional materials, siloxanes, elastomers, waxes, etc. to modify and improve printing performance, and pigments to impart color to inks.

Lithographic-printing inks based on the resins described above can be cured by all methods typically used to crosslink acrylic materials. Cure, or crosslinking, is usually accomplished through a free radical chain mechanism, which may require any of a number of free radical-generating species such as peroxides, hydroperoxides, REDOX combinations, etc., which decompose to form radicals when heated; additionally, curing can be achieved at ambient temperature in the presence of amines or transition metal promoters. Ultraviolet (UV) radiation is another means of initiating reaction by decomposing an appropriate photoinitiator to form free radicals. Electron beam (EB) radiation can also be used to effect cure.

The lithographic inks based on this new self-initiating resin technology can UV-cure at commercial line speeds to give prints with good color strength at significantly lower photoinitiator levels. The behavior of these inks on a hydroscope was very similar to that of commercial inks with good viscosity, tack and torque values.

The novel ink formulations disclosed here exhibit performance properties that make them very effective when printed on a range of substrates. These properties can be modified greatly depending upon oligomer composition and coating formulation rather than by blending with additives, as is done in traditional UV ink systems. The inks can exhibit wide ranges of gloss, rheological performance, flexibility, stain resistance, scratch resistance, weather resistance, solvent resistance, etc. Almost any desired ink performance parameter can be attained by proper selection of the raw material building blocks used to make the oligomers that form the basis of the ink formulation.

Other objects and advantages will become apparent from the following disclosure.

SUMMARY OF INVENTION

The present invention provides a family of radiation-curable ink formulations specifically for lithographic printing applications. An aspect of the present invention provides ink formulations based on multifunctional acrylate resins formed by the reaction of acrylate monomers and oligomers with β-dicarbonyl compounds such as β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions.

An aspect of the present invention provides a UV-curable Michael let-down resin composition, for a lithographic ink comprising a β-dicarbonyl monomer having a central methylene carbon, at least one multi-functional acrylate oligomer Michael added to said carbon, and at least one secondary amine for a partial tertiary amine modification of the acrylate groups. A further aspect provides that the resin is insoluble in water, but forms an emulsion with water. A still further aspect provides that the resin has a viscosity of from about 300 to about 500 poise.

An aspect of the present invention provides a UV-curable Michael resin composition, wherein the β-dicarbonyl monomer is selected from the group consisting of β-keto esters, β-diketones, β-keto amides, and cyanoacetates. An aspect provides a preferred β-dicarbonyl monomer is 2-methoxyethyl acetoacetate.

An aspect of the present invention provides a UV-curable Michael resin composition, wherein the multi-functional acrylate is selected from the group consisting of polyester, epoxy and urethane acrylates. An aspect provides a preferred acrylate oligomer is an epoxy acrylate. An aspect provides a preferred epoxy acrylate is a low viscosity epoxy acrylate.

An aspect of the present invention provides a lithographic ink comprising pigment dispersion, a let-down resin, optionally one or more monomers, a reactive foam control agent, and optionally a photoinitiator.

An aspect of the present invention provides a method of lithographic printing comprising providing the inventive lithographic ink to a lithographic press. A further aspect provides applying the ink to a substrate using a lithographic press loaded with the inventive ink and curing the ink.

A further aspect of the present invention provides a substrate coated with the lithographic ink.

Still a further aspect of the present invention provides a lithographic press containing the inventive lithographic ink.

An aspect of the present invention provides ink formulations that will cure (cross-link) under standard UV-cure conditions with significantly less photo-initiator than is required by traditional formulations. A further aspect provides dual-functional inks derived from multi-functional polyacrylate oligomers. The inks of the present invention are dual-functional, because they possess both an acrylic functionality and a labile ketone that, upon irradiation with UV light, dissociates to form a free radical.

An aspect of the present invention provides inks, in particular, lithographic inks that may suitably incorporate other materials to enhance properties desired in the inks. Suitable property-enhancing inclusion materials may include reactive (conventional acrylates) and non-reactive (e.g., solvents) components that may also be incorporated into the formulation to enhance the performance properties of the ink such as adhesion to various substrates, gloss, or solvent resistance. These materials include a variety of acrylic monomers and oligomers, vinyl monomers, such as N-vinyl-caprolactam and vinyl ethers; primary, secondary and tertiary amines, acid-functional monomers and oligomers, silicones, waxes and elastomers, and other materials.

An aspect of the present invention provides multifunctional acrylate lithographic let-down resins that provide acceptable rheology, color, and adhesion characteristics of inks for the substrates and devices encountered in lithographic printing applications.

An aspect of the present invention provides a UV-cured litho ink having excellent gloss and adhesion properties.

An aspect of the present invention provides litho inks that may be cured via chemical or thermal means, or by exposure to UV or electron beam radiation.

An aspect of the present invention provides litho ink formulations that exhibit performance properties that make them very effective across a range of substrates. According to a further aspect, these properties can be greatly modified as a function of varying oligomer composition and other ingredients of the final ink formulation. According to a further aspect, means are provided for more economical ink formulations that allow for varying properties without requiring blending with additives, as is done in traditional UV ink systems. According to yet a further aspect, the inks of the present invention exhibit a wide range of gloss, rheological performance, flexibility, stain resistance, scratch resistance, weather resistance, solvent resistance, as well as other desirable properties. Almost any desired ink performance parameter can be attained by proper selection of the raw material building blocks used to make the oligomers that form the basis of the ink formulation.

According to an aspect of the present invention, final ink properties can be modified by a plurality of means including the use of additional or supplementary acrylate materials, the use of various β-dicarbonyl compounds, or by simple variation of the stoichiometry of the reactants comprising the oligomer.

According to an aspect, the present invention provides Michael litho let-down resins comprising: an oligomeric acrylate chosen from the class of epoxy, urethane or polyester acrylates, a β-dicarbonyl compound, and a secondary amine for partial acrylate modification.

According to an aspect, the present invention provides a let-down resin for a lithographic ink comprising a β-dicarbonyl monomer having a central methylene carbon, at least one acrylate oligomer Michael added to said carbon, and at least one secondary amine for a partial tertiary amine modification of the acrylate groups.

According to an aspect, the present invention provides a UV-curable litho-ink formulation comprising, on a parts by weight basis: from about 10 parts to about 60 parts of a pigment dispersion, from about 30 parts to about 75 parts of a Michael litho let-down resin, up to about 20 parts of one or more reactive monomers, up to about 2 part of a reactive or non-reactive defoaming additive, and up to about 10 parts of a photoinitiator.

According to an aspect, the present invention provides a method of manufacturing a UV-curable litho-ink formulation, comprising: mixing from about 5 parts to about 70 parts of a pigment dispersion, from about 10 parts to about 90 parts of a litho let-down resin, mixing thereto up to about 1 part of a reactive or non-reactive defoaming additive, and mixing thereto up to about 10 parts of a photoinitiator, wherein all parts are by weight.

According to an aspect, the present invention provides a method of lithographically printing a substrate using a UV-curable litho-ink formulation, comprising: applying the inventive UV-curable lithographic ink to a substrate, optionally using a lithographic press and curing the ink on the substrate.

According to further aspects of the present invention substrates and surfaces printed with the inventive inks are provided.

DETAILED DESCRIPTION OF A PREFERRED EMBODIMENT

Figure 1:
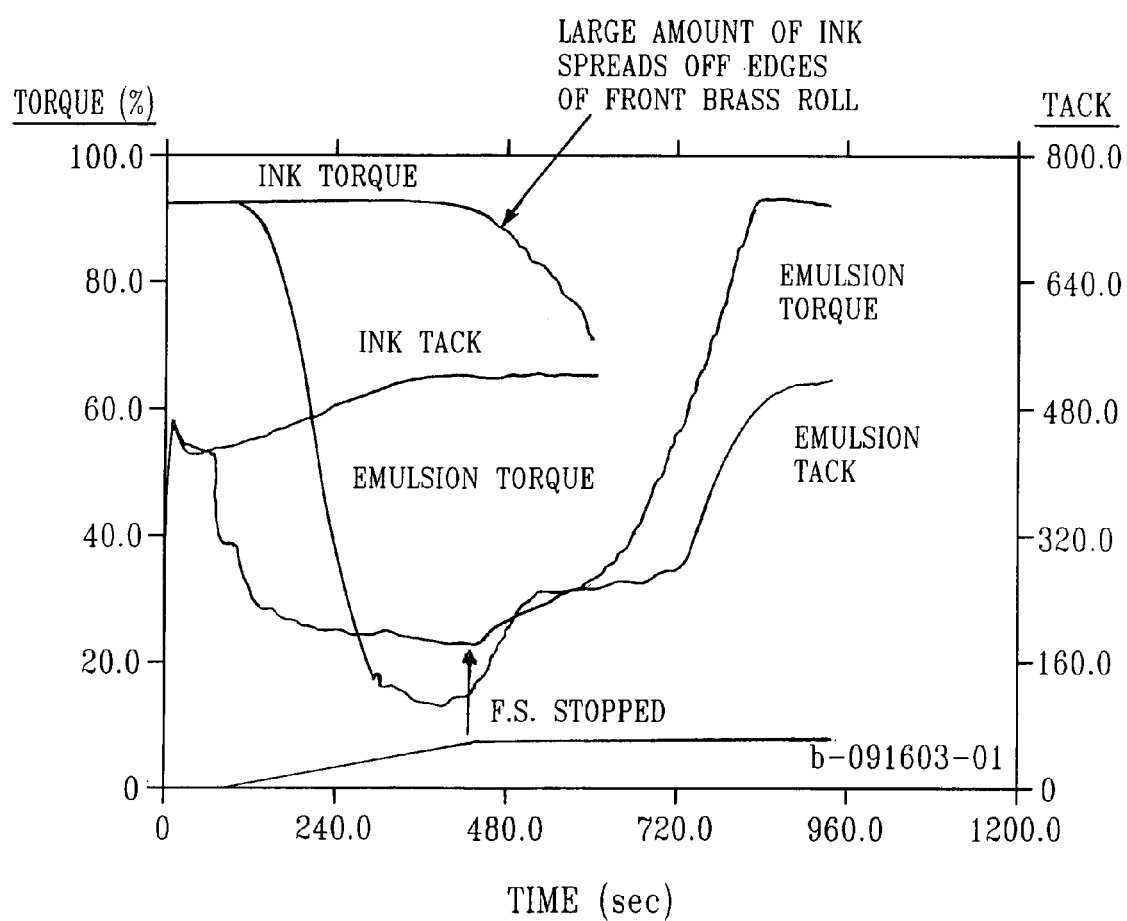
FIG. 1 depicts Testprint hydroscope analysis of UV cyan ink b-091603-01 in the presence of Fuji Hunt fountain solution.

Examples are provided in the next section to illustrate details of the synthesis of these novel materials as well as their application in coatings. Specific reaction conditions and reaction parameters for any liquid oligomeric resin given in the examples are not limiting for the invention.

The litho-inks of the present invention comprise three main components: a resin based pigment dispersion, a let-down resin, and a set of accessory components. A preferred pigment dispersion is based on Michael dispersion resins disclosed in co-pending application 10/682,875, the entire contents of which is hereby incorporated by reference for all purposes. The surface tension and pigment dispersing characteristics of the base oligomer are directly related. Generally the lower the surface tension and the higher the polarity, the better the pigment wetting characteristics will be. When these parameters are optimized a smaller pigment particle size in the finished ink results. The smaller the particle size the higher the transparency and gloss of the final ink. For white inks, the more well-dispersed the pigment particles are, the better the opacity (hiding). An acceptable grind is achieved when the pigment particle size is 5 microns or less.

The set of accessory components includes substances chosen to adapt the rheology of pigment dispersions to the substrates on which the inks are printed and to the various devices used in the printing processes. The set of accessory components comprises: photo-initiators, monomers chosen to promote adhesion to the substrate, leveling agents, and de-foaming agents.

The lithographic inks of the present invention are distinguished by the Michael let-down resin use in their formulation. Normally, to enhance wettability and thereby adhesion, the surface energy of the substrate should be 10 dynes/cm higher than the surface tension of the coating. Plastic substrates, either intrinsically or after surface treatment, have surface energies of at least 35 dynes/cm. Cellulosic substrates have higher surface energies in the range of about 50 to 70 dynes/cm. The let-down resin is characterized by a proper balance of hydrophilic and hydrophobic groups in its chemistry to provide good emulsion with fountain solution and proper partitioning of the ink to the image areas of the printing plate. The proper choice of the let-down resin also provides good tack to the ink which allows for good transfer of the ink on to the substrate via a number of rotating cylinders.

In the following Examples, ink was applied to a variety of substrates using a Quick Peek apparatus. Cure was accomplished by exposure to a single 600 W Fusion "H" bulb at the specified dose and a belt-speed of up to 140 feet/minute. Gloss and adhesion assessments of the cured inks were performed as indicated.

Ink performance properties were measured by a variety of test methods familiar to those skilled in the art.

Viscosity was determined with a Laray viscometer. During lithographic printing operations, ink is transferred among a series of rollers and ultimately to the printed substrate. These rollers rotate at a very high speed. If the ink does not have the correct rheology as the ink splits at the roller nip, "misting" of the ink occurs and droplets of ink become airborne. Acceptable ink must be low misting in nature. Misting is controlled by the ink viscosity. The inks of the present invention have viscosities in the range of from about 100 to about 500 poise.

Emulsion behavior was measured with a Testprint hydroscope. Lithography depends on the immiscibility of oil and water phases. The lithographic inks of the present invention are insoluble in water, but form an emulsion with water.

Gloss was measured using a BYK Gardner™ model 4520 micro-TRI-gloss meter (BYK-Gardner USA, Columbia, Md.) with a coated substrate placed on black felt. The light source was placed at a 60° angle. The test is based on ASTM D523-89.

As is known in the art, tack-free cure is a qualitative assessment of film surface cure that requires no stickiness or "greasiness" to the touch of an ungloved finger or palm and no tack with the finger of a latex glove. Herein, tack is assessed by rubbing a cotton swab over the cured surface.

Adhesion of the inventive inks to substrates was measured according to a modification of the crosshatch method of ASTM 2359. Cross-hatching was omitted. The test reports values OB to 5B; OB being a total failure and 5B comprises excellent adhesion.

EXAMPLES

The following examples illustrate the constitution, application, cure and performance properties of ink formulations detailed in this disclosure. Comparative formulations 1–3 are "benchmark" formulations based on commercially available materials. These formulations are comprised of commercial raw materials, in parts by weight, as specified in Tables 1 to 3. UCB Viaset® vehicles are a mixture of monomers and oligomers that have been optimized for lithographic applications. Similarly, UCB ViaCure® vehicles are a mixture of photoinitiators optimized for various colored ink formulations. Comparisons of conventional and inventive inks were performed using Pigment Yellow 13 Irgalite LB1W (CIBA), Pigment Blue 15:3 Irgalite GLVO (phthalocyanine blue, CIBA) and Pigment Red 57:1 Irgalite L4BH (metallized azo red, CIBA).

For standard formulations, pigments were dispersed at 30% loading in Ebecryl 3411, using a 3-roll mill. The dispersion was then let down with the rest of the formulation to get printable ink of suitable viscosity.

TABLE 1

Standard Yellow Litho-Ink Formulation (LithoUCB-y-011904-06)

| Raw Material | Description | Parts (w/w) |
| --- | --- | --- |
| Irgalite LBIW | Yellow pigment | 15.00 |
| Ebecryl 3411 | Epoxy acrylate | 35.00 |
| Viaset 420 | UCB vehicle for let-down of litho inks | 21.00 |
| Viaset 421 | UCB vehicle for let-down of litho inks | 20.00 |
| LG-99 (Estron chemicals) | Reactive Foam Control Agent | 1.00 |
| ViaCure-DX | UCB photoinitiator vehicle for ink applications | 8.00 |

TABLE 2

Standard Red Litho-Ink Formulation (LithoUCB-R-011904-04)

| Raw Material | Description | Parts (w/w) |
| --- | --- | --- |
| Irgalite L4BH | Red pigment | 15.00 |
| Ebecryl 3411 | Epoxy acrylate | 35.00 |
| Viaset 420 | UCB vehicle for let-down of litho inks | 21.00 |
| Viaset 421 | UCB vehicle for let-down of litho inks | 20.00 |
| LG-99 (Estron chemicals) | Reactive Foam Control Agent | 1.00 |
| ViaCure-DX | UCB photoinitiator vehicle for ink applications | 8.00 |

TABLE 3

Standard Blue Litho-Ink Formulation (LithoUCB-b-011904-02)

| Raw Material | Description | Parts (w/w) |
| --- | --- | --- |
| Irgalite GLVO | Blue pigment | 15.00 |
| Ebecryl 3411 | Epoxy acrylate | 35.00 |
| Viaset 420 | UCB vehicle for let-down of litho inks | 21.00 |
| Viaset 421 | UCB vehicle for let-down of litho inks | 20.00 |
| LG-99 (Estron chemicals) | Reactive Foam Control Agent | 1.00 |

TABLE 3-continued

Standard Blue Litho-Ink Formulation (LithoUCB-b-011904-02)

| Raw Material | Description | Parts (w/w) |
|---|---|---|
| ViaCure-DX | UCB photoinitiator vehicle for ink applications | 8.00 |

For examples 1 to 3, formulations 1A through 3A contain specific photoactive FlexCure™ resins as "drop in" replacements for the commercial oligomers detailed in Tables PF-1 to PF-3. Particular effort was made to replace only the oligomer and monomer portions of the benchmark formulations so that the formulations comprising the current invention could be better compared and contrasted with the standard. Definition of each experimental oligomer is found in Table EO-1.

Michael dispersion resin. A Michael polyacrylate resin is equivalently termed a Michael oligomer, a Michael adduct, or a Michael addition product. A preferred Michael dispersion resin, FlexCure® D40 was synthesized as follows: propoxylated glycerol triacrylate (GPTA, 56.7 g), hexanediol diacrylate (HDDA, 40.0 g), Ebecryl® 81 (53.0 g), ethoxylated nonylphenol acrylate (19.9 g), ethyl acetoacetate (EAA, 14.4 g), 2,4-pentanedione (11.0 g), glycidyl methacrylate (4.0 g), and tetrabutylammonium bromide (1.0 g) were weighed into a 500 ml, 3-neck round bottom flask equipped with a mechanical stirrer and condenser. The solution was heated to 95° Celsius and held at that temperature until an appropriate viscosity, corresponding to 100% disubstitution of the Michael donor, was achieved. After 3.5 h, a viscous yellow liquid having a cone and plate viscosity of 3490 cP was obtained. The yellow liquid did not gel upon standing.

The Michael addition reaction is catalyzed by a strong base. A preferred base is diazabicycloundecene (DBU), which is sufficiently strong and is readily soluble in the monomer mixtures. Other cyclic amidines, for example diazabicyclononene (DBN) and guanidines, for example 1,1,3,3-tetramethyl guanidine, are also suitable for catalyzing this addition reaction. Group I alkoxide bases such as potassium tert-butoxide, provided they have sufficient solubility in the reaction medium, are typically adequate to promote the desired reaction. Quaternary hydroxides and alkoxides, such as tetrabutyl ammonium hydroxide or benzyltrimethyl ammonium methoxide, comprise another class of preferred base catalysts to promote the Michael addition reaction. The synthesis of resin D-30R is presented schematically in FIG. 2 which shows that strong, organophilic alkoxide bases can be generated in situ from the reaction between a halide anion (e.g., quaternary halide such as tetrabutylammonium bromide) and an epoxide moiety such as glycidyl methacrylate. Such in situ catalysts are disclosed in pending application Ser. No. 10/255,541 assigned to Ashland, Inc., the assignee of the present application. The entire contents of Ser. No. 10/255,541 are hereby incorporated by reference for all purposes.

Michael acceptors used to synthesize Michael dispersion resins include polyester acrylates, epoxy acrylates, urethane acrylates, acrylic monomers, amine-modified acrylates and mixtures thereof. Moreover, the molar ratio of the various acceptors to the Michael donor may suitably range from 2.0 to 8.0.

Oxygen inhibition at the surface of an acrylate coating can be reduced by incorporation of amine synergist into the resin backbone. Amine modification of the acrylate oligomer is achieved by admixing primary and/or secondary amines with the blend of acrylate oligomers in a "pseudo Michael Addition reaction" wherein the amines form covalent bonds with acrylic unsaturation in a one-to-one addition. Preferred amines include alkyl, cycloalkyl and alkanol amines, and dialkyl or dialkanol amines. Non-limiting examples of specific preferred amines include ethanolamine, isopropanolamine, cyclohexylamine, butlyamine, hexylamine, laurylamine, piperidine, substituted piperidines, morpholine, diethanolamine, diisopropylamine, and/or dibutylamine.

The β-dicarbonyl Michael donor used to synthesize Michael dispersion resins preferentially comprises ethyl acetoacetate (EAA) and 2,4-pentanedione (2,4-PD). EAA is preferentially present in a 0.50 molar ratio compared to moles of total acceptor. Non-limiting examples of suitable β-dicarbonyl donors include ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxylethyl acrylate, 2-acetoacetoxylethyl methacrylate, allyl acetoacetate, benzyl acetoacetate, 2,4-pentanedione, 2,4-hexanedione, 3,5-heptanedione, isobutyl acetoacetate, and 2-methoxyethyl acetoacetate, 1,4-butanediol diacetoacetate, 1,6-hexanediol diacetoacetate, neopentyl glycol diacetoacetate, cyclohexane dimethanol diacetoacetate, ethoxylated bisphenol A diacetoacetate, trimethylol propane triacetoacetate, polycaprolactone triacetoacetates, pentaerythritol tetraacetoacetate, and mixtures thereof. Moreover, the molar ratio of donor to acceptor may vary from about 0.125 to about 0.5.

TABLE IV

Preferred Michael Lithographic Dispersion Resin (FlexCure™ D-40)

| Material | Weight % |
|---|---|
| GPTA | 28.4 |
| amine-modified polyester acrylate | 26.5 |
| HDDA | 20.0 |
| Ethoxylated nonylphenol acrylate | 9.9 |
| ethylacetoacetate | 7.2 |
| 2,4-pentanedione | 5.5 |
| catalyst package | 2.5 |

A preferred embodiment of the present invention is a lithographic let-down resin designated 7069-45 which has a viscosity of 468 poise at 25° C. It is composed (on a weight % basis) of 84.6% epoxy acrylate, 11.6% 2-methoxyethyl acetoacetate, 2.5% catalyst package, and 2.4% secondary amine.

Example 1

Yellow Litho-ink Formulation Based on FlexCure Resins:

The final formulation (Litho-y-011904-05) is comprised of FlexCure™ resins and commercial raw materials, in parts by weight, as specified in Table V:

Formulation Table V (components in parts by weight).

| Raw Material | Description | Parts (w/w) |
|---|---|---|
| Irgalite LBIW | Yellow pigment | 15.00 |
| FlexCure D-30 | Ashland self-initiating resin | 35.00 |

-continued

Formulation Table V (components in parts by weight).

| Raw Material | Description | Parts (w/w) |
|---|---|---|
| 7069-45 | Ashland self-initiating resin | 44.00 |
| LG-99 (Estron chemicals) | Reactive Foam Control Agent | 1.00 |
| ViaCure-DX | UCB photoinitiator vehicle for ink applications | 5.00 |

Example 2

Red Litho-ink Formulation Based on FlexCure™ Resins:

The final formulation (Litho-R-01 1904-03) is comprised of FlexCure™ resins and commercial raw materials, in parts by weight, as specified in Table VI:

Formulation Table VI (components in parts by weight).

| Raw Material | Description | Parts (w/w) |
|---|---|---|
| Irgalite L4BH | Red pigment | 15.00 |
| 7069-123 | Ashland self-initiating resin | 35.00 |
| 7069-45 | Ashland self-initiating resin | 44.00 |
| LG-99 (Estron chemicals) | Reactive Foam Control Agent | 1.00 |
| ViaCure-DX | UCB photoinitiator vehicle for ink applications | 5.00 |

Example 3

Blue Litho-ink Formulation Based on FlexCure™ Resins:

The final formulation (Litho-b-011904-01) is comprised of FlexCure™ resins and commercial raw materials, in parts by weight, as specified in Table VII:

Formulation Table VII (components in parts by weight).

| Raw Material | Description | Parts (w/w) |
|---|---|---|
| Irgalite GLVO | Blue pigment | 15.00 |
| FlexCure D-30 | Ashland self-initiating resin | 35.00 |
| 7069-45 | Ashland self-initiating resin | 45.00 |
| LG-99 (Estron chemicals) | Reactive Foam Control Agent | 1.00 |
| ViaCure-DX | UCB photoinitiator vehicle for ink applications | 4.00 |

A preferred Michael lithographic let-down resin, 7069-45, was synthesized by a procedure similar to that used to obtain oligomer FlexCure D40. A mixture comprising epoxy acrylate (422.9 g), 2-methoxyethyl acetoacetate (57.9 g), glycidyl methacrylate (9.9 g), and tetrabutyl ammonium bromide (2.5 g) was placed into a 1000 mL 3-neck round bottom flask equipped with a mechanical stirrer and condenser. The solution was heated to 95° Celsius and held at that temperature until an appropriate viscosity, corresponding to 100% disubstitution of the Michael donor, was achieved. After 3 h, the reaction was cooled down and 6.9 g DEA was added to cap a portion of the pendant acrylate groups. The final product was a viscous yellow liquid with a cone and plate viscosity of 468 P @50° C. that did not gel upon standing.

Industry standard pigments were chosen to compare the UV-cure resins of the present invention against conventional UV-cure resins. The yellow pigment chosen was Pigment Yellow 14 Irgalite LBIW (diarylide yellow, CIBA). The chosen blue pigment was Pigment Blue 15:3 Irgalite GLVO (phthalocyanine blue, CIBA). The chosen red pigment was Pigment Red 57:1 Irgalite L4BH(metallized azo red, CIBA). The various pigments were chosen as being standard to the industry. The present invention is not limited to the recited pigments. Persons of skill in the industry may readily determine other suitable pigments.

Michael resin pigment-dispersion. A blue pigment was ground in a dispersion resin using a 3-roll mill. A preferred embodiment utilizes oligomer FlexCure D40 as the dispersion resin. Other Michael dispersion resins may suitably be used for inks of the present invention. A preferred Michael resin-pigment dispersion (grind formulation) for blue ink comprises 70 parts by weight of Michael oligomer FlexCure D40 and 30 parts of blue pigment. The resin may suitably comprise, on a weight basis, from about 10 parts to about 75 parts. The pigment may suitably comprise, on a weight basis, from about 10 parts to about 90 parts. Michael dispersion resins and pigment dispersions are disclosed in co-pending application Sererial Number 10/682,875 the entire contents of which is hereby incorporated for all purposes.

The dispersions are mixed with suitable lithographic let-down resins of the present invention and additives to give the desired ink formulation (litho). An advantage accrues from having the dispersion resin differ from the let-down resin because let-down resins can incorporate adhesion, rheology and other performance enhancing properties. The ink is lithographically-printed onto various substrates. Curing is affected with a 600 W/in Fusion "H" bulb at the doses specified.

Example 5

Comparative Evaluation of the Lithographic Ink Formulations:

TABLE VIII

| Formulation | % pigment | % PI | Dosage for tack-free cure (mJ/cm$^2$) | Gloss (60°) | Adhesion (coated paper) |
|---|---|---|---|---|---|
| Litho-y-011904-05 | 15 | 5.0 | <300 | 35.0 | 5B |
| LithoUCB-y-011904-06 | 15 | 8.0 | <300 | 60.2 | 5B |
| Litho-R-011904-03 | 15 | 5.0 | <300 | 39.0 | 5B |
| LithoUCB-R-011904-04 | 15 | 8.0 | <300 | 51.1 | 5B |
| Litho-b-011904-01 | 15 | 4.0 | <300 | 46.6 | 5B |
| LithoUCB-b-011904-02 | 15 | 8.0 | <300 | 56.8 | 5B |

The examples listed in the above table compare and contrast the performance of the various color inks formulated with FlexCure resins and commercial UCB vehicle expressly sold for lithographic ink formulation purposes.

The obvious advantage of the FlexCure ink formulations over the commercial standards is the much lower photoinitiator requirement of the former to achieve comparable adhesion and gloss levels. This could translate into significant cost savings as well as handling benefits from using less of the traditional photoinitiators which can be toxic and/or malodorous.

Example 6

Comparative Performance of Inks on the Hydroscope

The hydroscope is a new device developed by Testprint, B.V. It is used for research in lithographic ink development to investigate the ink/fountain solution interaction, and predict transfer capabilities on a printing press. The key to good print quality in lithography is maintaining an appropriate ink/fountain solution balance. This comprises not only the amount of fountain solution taken up by the ink during printing, but also the nature of the emulsion created (droplet size, stability, effects on ink tack and transfer).

The hydroscope unit simulates a printing press in that it possesses a roller system onto which the ink is introduced. The distance between the rollers determines the ink layer thickness as well as the shear rate to which the ink is subjected in the nip. Shear rate is also determined by roller speed. The rollers are liquid cooled and possess a large cooling surface which minimizes temperature buildup and consequent erroneous readings. Fountain solution is introduced to the ink roller at different volumes and flow rates by either dispensing droplets or atomizing a fine spray. As the ink and fountain solution emulsify, the resultant tack and torque due to film splitting forces are measured as a result of this emulsification.

It is generally accepted due to prior work done with the instrument that the ideal shape of the resultant tack curve for the emulsion is "bowl shaped" (FIG. 1). Additionally, the tack and torque for the un-emulsified ink should remain relatively constant. This can be seen below for the FlexCure inks and the standard ink based on UCB oligomer vehicles.

Lastly, it is expected that ink which recovers its original tack and torque (after the fountain solution metering is discontinued) should have good press performance. This behavior is evident in the FlexCure ink below.

contents of U.S. Pat. Nos. 5,945,489 and 6,025,410; co-pending application Ser. No. 101255,541, and co-pending application Ser. Nos. 10/628,373; 10/722,478; 10/712,044; 10/834,056, 10/836,747; 10/682,875; 11/160,597; and 10/834,176 are herein incorporated by reference and for all purposes.

Having thus described our invention, what we claim as new, and desire to secure by Letters Patent is:

1. A lithographic ink comprising:
    a pigment dispersion;
    a let-down resin comprising:
        a β-dicarbonyl Michael donor;
        at least one multi-functional acrylate oligomer; and
        at least one secondary amine, wherein
            said resin is insoluble in water,
            said resin forms an emulsion with water, and
            said uncrosslinked resin has a viscosity of from about 100 to about 500 poise;
    a foam control agent; and optionally
    a monomer.

2. The UV-curable Michael resin composition, according to claim 1, wherein said β-dicarbonyl monomer is selected from the group consisting of β-keto esters, β-diketones, β-keto amides, and cyanoacetates.

3. The UV-curable Michael resin composition, according to claim 2, wherein a preferred β-dicarbonyl monomer is 2-methoxyethyl acetoacetate.

4. The UV-curable Michael resin composition, according to claim 1, wherein said multi-functional acrylate oligomer is selected from the group consisting of polyester, epoxy and urethane acrylates.

5. The UV-curable Michael resin composition, according to claim 4, wherein a preferred acrylate oligomer is an epoxy acrylate.

6. The UV-curable Michael resin composition, according to claim 5, wherein a preferred epoxy acrylate is a low viscosity epoxy acrylate.

7. The lithographic ink according to claim 1, further comprising a photoinitiator.

8. A method of lithographic printing comprising providing the lithographic ink of claim 1 to a lithographic press.

TABLE IX

Hydroscopic Analysis of Representative Inks.

| Sample | Viscosity, N (60s, fin.) (ink) | Viscosity, N (60s, fin.) (emulsion) | Tack (60s fin.) ink | Tack (60s fin.) emulsion | Torque (60s fin.) ink | Torque (60s fin.) emulsion | F.S. content | Free F.S. | Drip |
|---|---|---|---|---|---|---|---|---|---|
| UCB-b-033103-01 | 600, 0.93 | 540, 0.92 | 600, 610 | 300, 660 | 80, 80 | 53, 80 | 0.9 | Yes | No |
| Litho-b-091603-01 | 550, 0.98 | 520, 0.97 | 430, 520 | 180, 510 | 92, 71 | 14, 92 | 0.8 | No | No |

INCORPORATION BY REFERENCE

All publications, patents, patent applications, and ASTM test methods cited in this specification are herein incorporated by reference, and for any and all purposes, as if each individual publication, patent, patent application, or ASTM method were specifically and individually indicated to be incorporated by reference. In the case of inconsistencies the present disclosure will prevail. Most especially, the entire 9. The method of lithographic printing, according to claim 8, further comprising applying said ink to a substrate using said press and curing said ink.

10. A substrate coated with the lithographic ink of claim 1.

11. A lithographic press containing the lithographic ink of claim 1.

* * * * *